June 11, 1929.　　　T. C. MOORSHEAD　　　1,716,456
GLASS FURNACE
Filed June 11, 1928　　　2 Sheets-Sheet 1
Fig. 1.
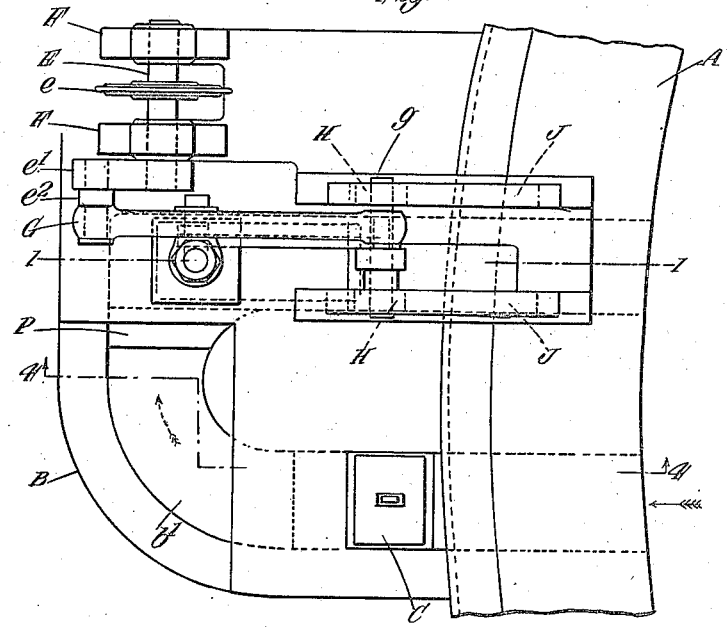
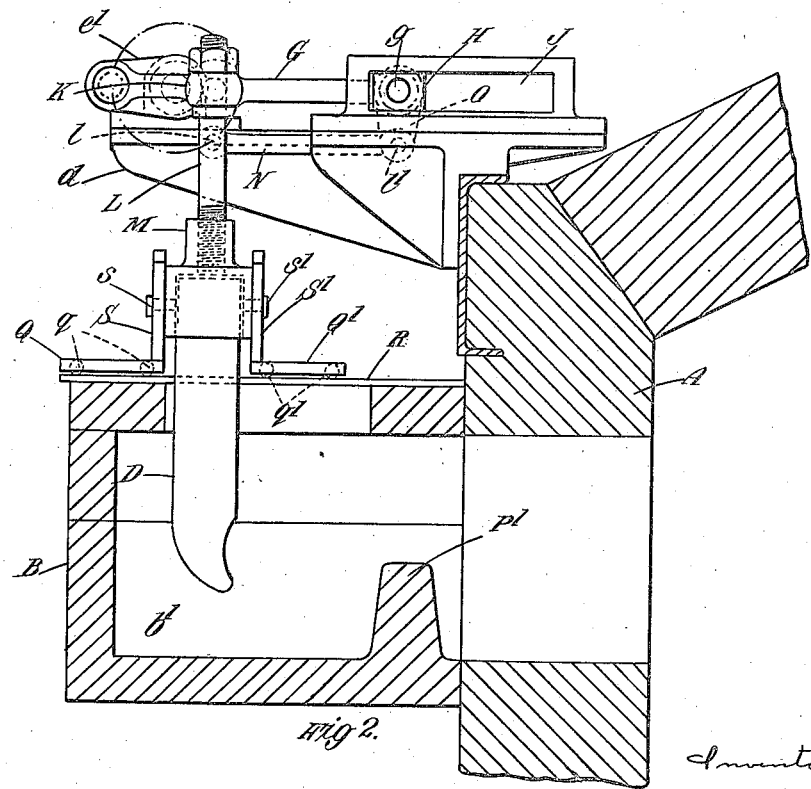
Fig. 2.
Inventor
Thomas Courtney Moorshead
By
Pennie Davis ... 
Attorneys

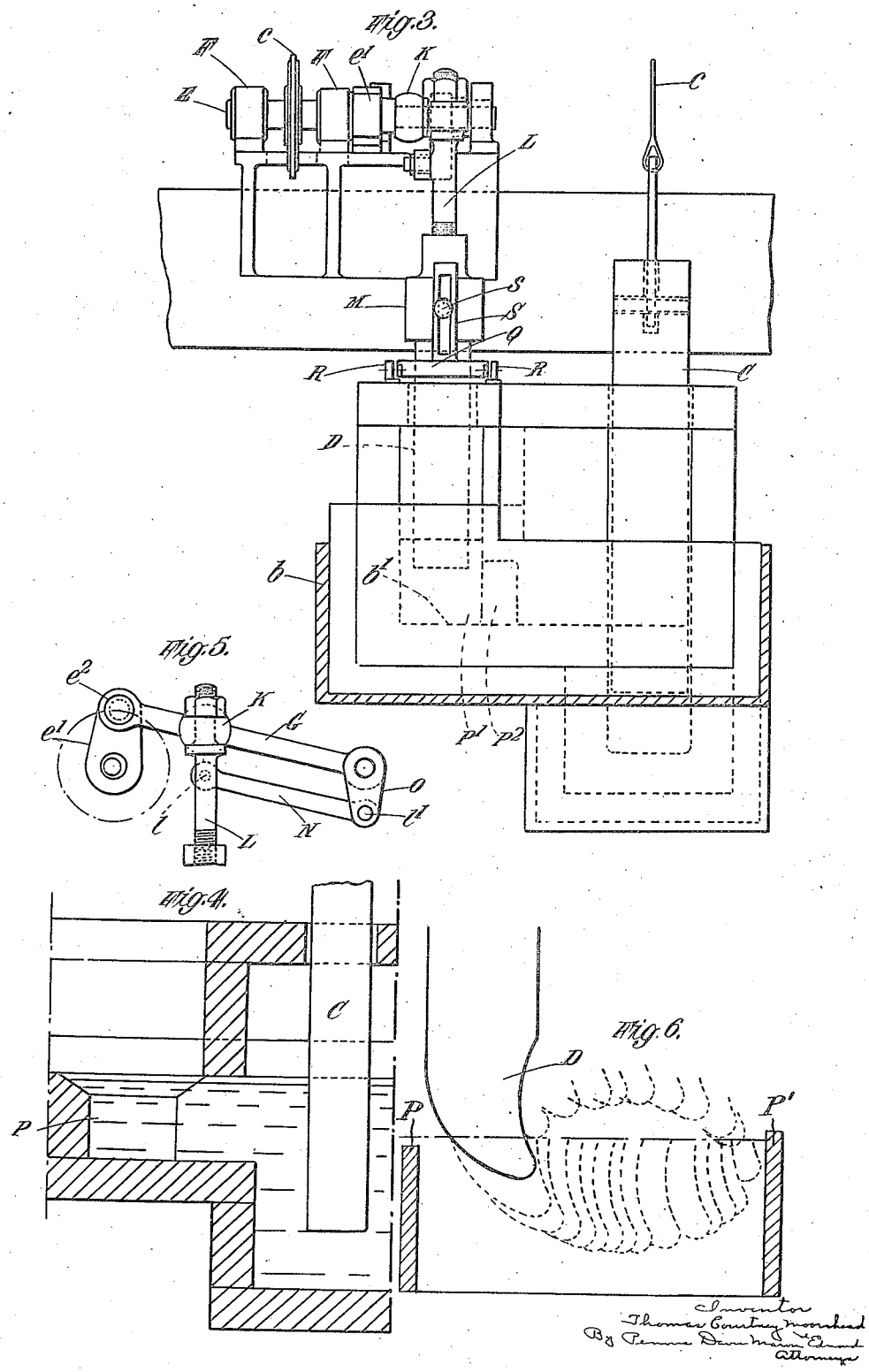

Patented June 11, 1929.

1,716,456

UNITED STATES PATENT OFFICE.

THOMAS COURTNEY MOORSHEAD, OF STRAND, LONDON, ENGLAND, ASSIGNOR TO THE UNITED GLASS BOTTLE MANUFACTURERS, LIMITED, OF LONDON, ENGLAND, A BRITISH COMPANY.

GLASS FURNACE.

Application filed June 11, 1928, Serial No. 284,319, and in Great Britain June 1, 1927.

This invention relates to glass furnaces intended for use with bottle forming machines of the suction type and in which the furnace is provided with a forehearth and glass circulating means for circulating the glass in the forehearth.

According to the invention the furnace forehearth is provided with two dams and the glass circulating means is situated between them so as to displace the molten glass between the two dams over one of them thereby causing the molten glass in the rest of the forehearth to flow into the space between the dams from which space it is returned to the furnace by the glass circulating means. One of the dams may be situated at or near the point where the bottle forming machine sucks its charge and the other dam in front of the furnace the glass circulating means being situated between these two dams as aforesaid and operating to displace the molten glass between them towards the furnace by pushing or urging it over the dam which is situated in front thereof. The glass circulating means preferably comprises a refractory displacer or member which has imparted thereto a movement which causes the toe or operative end thereof to enter the molten glass in a downward and forward direction and leave it in an upward and backward direction, the result of this movement being to push or urge the molten glass towards the furnace over the said dam situated in front thereof.

In order that the said invention may be clearly understood and readily carried into effect the same will now be described more fully with reference to the accompanying drawings, in which:—

Figure 1 is a plan of the front portion of a furnace embodying my invention,

Figure 2 is a section taken along the line 1—1 in Figure 1.

Figure 3 is a side elevation.

Figure 4 is a section taken along the line 4—4 in Figure 1.

Figure 5 is a detail view showing the displacer operating mechanism and

Figure 6 illustrates diagrammatically the path of movement of the displacer during one complete revolution of the displacer operating mechanism and its relation to the dams. However, for purposes of illustration the dams are shown as if the forehearth were straight instead of curved.

A represents a portion of the front end of the glass furnace and B the forehearth. The forehearth is attached to the front end of the furnace by a bracket $b$ which in turn is attached to the buckstaves of the furnace in any convenient manner. $b'$ is a channel of horse-shoe shape in the forehearth. The part of the forehearth at the side where the molten glass enters from the furnace is made deeper than the other part to make room for a refractory plug C (see Figure 4) which by means of a wire rope $c$ and mechanism not shown can be raised or lowered so as to enter to a lesser or greater extent into the molten glass. This plug serves to control the temperature of the molten glass entering the forehearth as on raising the plug the hotter glass from near the surface enters the forehearth whereas on lowering the plug the cooler glass enters. P, P' are the two dams one of which namely P is situated at or near the point where the bottle forming machine sucks its charge. The top of this dam is about one inch below the surface of the molten glass in the forehearth. The other dam P' is arranged in the forehearth in front of the furnace A. Between the dams P, P' is arranged the refractory displacer or member D for displacing the molten glass in the space between the dams P, P' over the dam P' towards the furnace A. The displacer, together with its operating mechanism, is supported on a bracket $d$ attached to the steel work of the furnace immediately above the forehearth B. The displacer operating mechanism comprises a shaft E supported in plummer blocks F, F. On the shaft E is a chain wheel $e$ by which the shaft is rotated the said chain wheel being driven by any suitable means either independently by a variable speed motor and reduction gearing or from the mechanism of the bottle forming machine. The shaft E has a crank $e'$ securely fixed thereto. On the crank $e'$ is a pin $e^2$ which engages with one end of a connecting rod G. The other end of the connecting rod has a crosshead pin $g$ attached to slide blocks H, H which slide in guides J, J. Attached to the connecting rod G but free to swivel thereon is an eye bracket K which supports a rod L having a screw threaded end which engages with a yoke or holder M in which the displacer D is carried. Attached to the rod L by means of a pin $l$ in another rod N the other end of which is connected by a pin $l'$ to a crank O securely fixed to the crosshead pin $g$. When the chain wheel $e$ is revolved the crank $e'$ is also revolved and reciprocates the connecting rod G in the guides J, J which results in the eye bracket K and the rod L moving in the path of an ellipse which movement is transmitted to the toe or operative end of the displacer D, the rod L, holder M and displacer D being always kept in a vertical position by means of the rod N which is attached to the rod L and the crank O as previously described.

The distance to which the toe or operative end of the displacer D enters the molten glass can be varied by raising or lowering the yoke or holder M on the screw threaded end of the rod L so that the quantity of molten glass displaced by the displacer can be varied. I do not wish to limit myself to the mechanism described for operating the displacer D as other mechanism could be employed for the purpose. The displacer D can be worked independently of the bottle forming machine and can be made to perform one or more strokes for each bottle made according to the speed at which the displacer operating mechanism is driven. Only as small a portion as possible of the forehearth is exposed for the proper working of the bottle forming machine, the other part of the forehearth being enclosed in a chamber which is open to the furnace so that the molten glass in the forehearth is not liable to be unduly chilled by exposure. An opening is made in the top of the chamber to allow for the movement of the displacer D and this opening is kept covered by means of refractory tiles Q, Q' adapted to move with the displacer D. The tiles Q, Q' are supported by small wheels $q$, $q$, $q'$, $q'$ running on rails R and are attached to the yoke M by brackets S, S' and pins $s$, $s'$, the pins being free to slide up and down in slots in the brackets S, S' so as to allow for the up and down movement of the displacer D. In some cases, however, the displacer could be connected up to the operating mechanism so that the said opening instead of being in the top of the chamber would be at the side thereof.

During the operation of the displacer D the molten glass in the space between the dams P, P' is urged over the dam P' into the furnace A and for the time being the level of the molten glass in the space between the two dams is lowered below that of the level of the glass in the rest of the forehearth with the result that the molten glass flows over the dam P to adjust the level and is again urged over the dam P' into the furnace by the displacer D. Thus the molten glass is kept in constant circulation in a practical and efficient manner.

The forehearth illustrated in the drawings is designed for a two or three mould suction machine. Larger machines having ten or fifteen moulds however can be fed by providing the forehearth with a plurality of displacers working in unison or by working a single displacer at a proportional increased speed. Although in the furnace illustrated the channel in the forehearth is shewn of horse-shoe shape I wish it to be understood that the channel could be of other shape according to the type and construction of bottle forming machine with which the furnace has to work.

What I claim and desire to secure by Letters Patent of the United States is:—

1. A glass furnace for use with bottle forming machines of the suction type comprising a forehearth, a plurality of dams positioned in said forehearth and glass circulating means situated between said dams, one of said dams being located adjacent the glass circulating means and the other of said dams being located between the circulating means and the furnace.

2. A glass furnace for use with bottle forming machines of the suction type comprising a forehearth, a dam positioned in the vicinity of the point where the bottle forming machine sucks its charge, a second dam positioned in front of the furnace and glass circulating means positioned between the said dams, the first mentioned dam also being adjacent the glass circulating means.

3. A glass furnace for use with bottle forming machines of the suction type comprising a forehearth, a dam positioned in the vicinity of the point where the bottle forming machine sucks its charge, a second dam positioned in front of the furnace and a refractory glass displacer situated between the said dams, the first mentioned dam also being adjacent the glass displacer.

4. A glass furnace for use with bottle forming machines of the suction type comprising a forehearth, a dam positioned in the vicinity of the point where the bottle forming machine sucks its charge, a second dam positioned in front of the furnace, a refractory glass displacer situated between the said dams, the first mentioned dam also being adjacent the glass displacer and means whereby movement is imparted to the said displacer causing the operative end thereof to enter the molten glass in a downward and forward direction and leave it in an upward and backward direction.

5. A glass furnace for use with bottle forming machines of the suction type comprising a forehearth, a dam positioned within the vicinity of the point where the bottle forming machine sucks its charge, a second dam positioned in front of the furnace, a refractory glass displacer situated between the said dams, the first mentioned dam also being adjacent the glass displacer and an oscillating and reciprocating member, one end of which is pivotally connected to the said displacer to cause movement thereof.

6. A glass furnace for use with bottle forming machines of the suction type comprising a forehearth, a plurality of dams positioned in said forehearth, glass circulating means situated between said dams, one of said dams being located adjacent the glass circulating means and the other of said dams being located between the circulating means and the furnace, and a shield or cover which moves with said means to cover that part of the forehearth through which the said means enters.

THOMAS COURTNEY MOORSHEAD.